United States Patent [19]

Piloni

[11] 3,923,755

[45] Dec. 2, 1975

[54] AMINE SULFONATES AS DYE SITES IN SUSPENSION POLYMERS

[75] Inventor: Robert Albert Piloni, Pottstown, Pa.

[73] Assignee: The Firestone Tire & Rubber Company, Akron, Ohio

[22] Filed: Mar. 20, 1974

[21] Appl. No.: 452,892

Related U.S. Application Data

[63] Continuation of Ser. No. 230,966, March 1, 1972, abandoned.

[52] U.S. Cl. ............... 260/79.3 MU; 8/4; 260/63 R; 260/501.21
[51] Int. Cl.$^2$ .................. C08F 15/40; C08F 15/02
[58] Field of Search ...... 260/79.3 MU, 79.3 R, 230, 260/966

[56] References Cited

UNITED STATES PATENTS

| | | | |
|---|---|---|---|
| 3,075,934 | 1/1963 | Grandine, Jr. | 260/29.6 |
| 3,236,881 | 2/1966 | Distler | 260/501 |
| 3,260,707 | 7/1966 | Caldwell | 260/79.3 |
| 3,538,061 | 11/1970 | Van Gaver | 260/78.5 |
| 3,547,899 | 12/1970 | Arlt | 260/79.3 |
| 3,663,520 | 5/1972 | Balwe | 260/87.5 |

FOREIGN PATENTS OR APPLICATIONS

| | | | |
|---|---|---|---|
| 1,289,737 | 2/1962 | France | 260/79.3 |

OTHER PUBLICATIONS

Sorenson, W. R. et al. Preparative Methods of Polymer Chemistry, Interscience Publishers, N.Y., 1961, p. 158.

*Primary Examiner*—Christopher A. Henderson, Jr.

[57] ABSTRACT

Ethylenically unsaturated compounds, and especially vinyl chloride and mixtures containing vinyl chloride and acrylonitrile, are copolymerized, in aqueous suspension, with salts of (a) sulfonic acids containing polymerizable ethylenic groups with (b) higher-alkyl-group-containing amino compounds. The resulting copolymers have excellent acceptance for cationic dyes, and are useful in filaments, films and molded articles.

6 Claims, No Drawings

AMINE SULFONATES AS DYE SITES IN SUSPENSION POLYMERS

This is a continuation of application Ser. No. 230,966 filed Mar. 1, 1972, now abandoned.

FIELD OF THE INVENTION

This invention relates to sulfonic-group-containing resins having excellent acceptance of cationic dyes, and to a novel process for the production thereof.

BACKGROUND OF THE INVENTION

Various ethylenically unsaturated monomeric compositions have heretofore been copolymerized with simple sulfonic-acid-group-containing monomers to provide polymers which are receptive to cationic dyes. However, it is difficult to conduct such copolymerizations in aqueous systems, such as emulsion or suspension systems, due to the solubility of the sulfonated monomer in the aqueous phase. Accordingly, such copolymerizations are generally carried out in the more expensive and troublesome solvent solution polymerization systems.

It is therefore an object of this invention to provide novel copolymers having good receptivity for cationic dyes. Another object is to provide such copolymers having sulfonic-group-containing monomers therein. A still further object is to provide a process for the production of such resin which can be carried out in aqueous systems such as emulsion or suspension systems.

SUMMARY OF THE INVENTION

The above and other objects are secured, in accordance with this invention, in a process which comprises the free-radical-initiated copolymerization, in aqueous suspension of a mixture comprising:

TABLE I

| | Parts by Weight |
|---|---|
| (I) An ethylenically unsaturated monomer or mixture of such monomers and | 100 |
| (II) An amine sulfonate salt of (II-a) A sulfonic-group-containing ethylenically unsaturated monomer with (II-b) A higher-alkyl-group-containing primary, secondary or tertiary amino compound | 0.1–10.0 |

A particularly preferred subset of the processes of this invention comprises the copolymerization of

TABLE II

| | Parts by Weight |
|---|---|
| (I) An ethylenically unsaturated monomer or mixture of monomers comprising (I-a) Vinyl chloride 10–100 parts (II-a) A third monomer or mixture of monomers copolymerizable with vinyl chloride 0–90 parts | totaling - 100 |
| (II) An amine sulfonate salt as in Table I | 0.1–10.0 |

The polymerization proceeds smoothly, with efficient incorporation of the amine sulfonate salt II into the copolymer. The Products exhibit excellent receptivity for cationic dyes, and may be formed into films, filaments and molded objects.

DESCRIPTION OF THE PREFERRED EMBODIMENTS

The Sulfonic-Acid-Group-Containing Monomer (II-a)

The sulfonic-acid-group-containing compound providing the anionic novelty of the salt (II) above may be any compound of the formula (II-9) [Cation ]$^+$[U-SO$_3$]$^-$ wherein U is an ethylenically unsaturated group of an activity appropriate for copolymerization with the other monomers in the mixture and "[Cation ]$^+$" indicates a hydrogen ion or appropriate metallic ion. Suitable compounds of this type will be seen to include any allyl or vinyl containing alkyl or aryl sulfonic acid, for instance styrene sulfonic acid, vinyl sulfonic acid, sulfoethyl methacrylate, 2-acrylamido-2-methylpropane sulfonic acid, methallyl sulfonic acid, α-methyl styrene sulfonic acid, allyl sulfonic acid, ortho methyl styrene sulfonic acid, sulfoethyl acrylate, 2-acrylamido-2-methyl butane sulfonic acid, vinyl benzyl sulfonic acid. In general the criterion of suitability of copolymerizability of the sulfonic-group-containing compound with typical commercial monomers is that it shall be copolymerizable with vinyl chloride, since most such monomers are in the same general area of reactivity. As a rough rule, the criterion of the copolymerizability of the sulfonic compound with vinyl chloride (and by extension, with most other commercial monomers) is that, on a mole percentage basis, an initial charge of 90% vinyl chloride, balance comonomer, shall yield an initial copolymer containing (a) at least 80% vinyl chloride, and (b) not more than 99% vinyl chloride.

The Higher-Alkyl-Group-Containing Amino Compounds —(II–b)

The higher fatty amino compound, hereinafter designated (II–b) providing the cationic moiety of the salt (II) may be any compound containing a primary, secondary or tertiary amine group and a higher alkyl group or groups containing a total of from 8 to 30 carbon atoms, such for instance as octyl decyl amine, N-coco beta amino butyric acid ("coco" signifies the mixed alkyl groups averaging about 12 carbon atoms derived from coconut oil), n-octyl amine, lauryl amine, octadecyl amine, hexadecyl amine, N-coco beta amino propionic acid, di-2-ethylhexyl amine, di-cyclohexyl amine, n-lauryl-myristyl beta amino propionic acid, dimethyl octyl amine, dimethyl lauryl amine, dimethyl tetradecyl amine, dimethyl hexadecylamine, dimethyl octadecyl amine, dimethyl behenyl amine, tributyl amine, triamyl amine, ethyl methyl octyl amine, dilauryl amine, behenyl amine, diamyl amine, ethyl cyclohexyl amine, long chain ethanol amines and long chain ethoxylated amines.

The Amine Salt II

The amine sulfonate salt monomer (II) may be any salt having its cation derived from the sulfonic compound (II–a) and the amino compound (II–b). If the monomeric compound (II) is not available as such, it may be readily prepared by reacting, in an acidified aqueous medium, a sodium or other salt of the sulfonic acid (II–a) with the amino compound (II–b). The resultant monomeric salt compound is precipitated and may be recovered by filtration or decantation and then used in the polymerization reaction. Alternatively, since aqueous media are involved, the monomer (II) may be prepared in situ in the aqueous medium in which the final polymerization takes place. In accordance with still another method, the amine (II–b), sulfonic acid (II–a) and a small amount of water are added to the monomer or monomers with which the salt (II) is to be copolymerized. The salt (II) is directly formed and dissolves rapidly in the monomer or monomers as the case may be.

The Ethylenically Unsaturated Monomer (I)

As noted above in the "Summary of the Invention" in Table II, the preferred products are prepared from copolymers of the amine sulfonate salt II with vinyl chloride and mixtures of vinyl chloride with third monomers. As such third monomer, acrylonitrile yields particularly excellent products when employed in the weight proportion of 90–10 parts of acrylonitrile and 10–90 parts of vinyl chloride. However, still other monomers may be used, either in admixture with vinyl chloride and/or acrylonitrile, or in the absence of these compounds. Examples of such other monomers include, for instance, vinyl acetate, styrene, methacrylates such as methyl methacrylate, di(2-ethyl hexyl) methacrylate, acrylates such as ethyl acrylate, ethyl vinyl ether, methyl vinyl ketone, vinylidene chloride, vinylidene bromide, vinylidene fluoro-chloride and the like; unsaturated hydrocarbons such as ethylene, propylene isobutene, and the like; allyl compounds such as allyl acetate, allyl chloride, allyl ethyl ether and the like; and conjugated and cross-conjugated compounds such as butadiene, isoprene, chloroprene, 2,3-dimethylbutadiene-1,3, piperylene, divinyl ketone, and the like. As noted above in discussing the sulfonic compound(II–9), most practical monomers have activities in the same general range, and are copolymerizable with vinyl chloride; accordingly it may be stated that any monomer which is copolymerizable with vinyl chloride may be used in this invention, with or without vinyl chloride. For a fairly complete list of materials known to copolymerize with vinyl chloride, reference may be had to Krozil: "Kurzes Handbuch Der Polymerisations—Technik—11 Mehrstoff Polymerization", Edward Bros., Inc., 1945, pp. 735-747, the items under "Vinyl chlorid." As a rough rule, the criterion of a practical comonomer for use with vinyl chloride, to produce copolymers containing 80% or more of vinyl chloride is that, on a mole percentage basis, an initial charge of 96% vinyl chloride, balance comonomer, shall yield an initial copolymer containing (a) at least 90% vinyl chloride, and (b) not more than 99% vinyl chloride.

The Polymerization Process

The polymerization process of this invention is carried out in suspension in an aqueous medium containing a colloidal-type suspending agent and a free-radical generating agent which is soluble in the monomeric phase. The mass is agitated to keep the monomer in suspension as globules in the medium, and the product is recovered as granules which are physically separated from the aqueous medium at the close of polymerization. The amine sulfonate salt (II) can either have been previously prepared and charged to the polymerization reactor mixture as such, or it may be synthesized in situ in the polymerization mass by charging the constituents (the sulfonic acid II–a or a salt thereof, and the amino compound II–b) thereof in stoichiometric proportions into the polymerization medium. Alternatively, the amine (II–b), sulfonic acid (II–a) and a small amount of water are added to the other monomers, and agitated therewith. Reaction occurs substantially instantaneously and quantitatively. Preferably the medium should be made slightly acidic, as by the addition of acetic acid, to insure reaction. In those cases where the polymerization rates of the several monomers are disparate, it may be desirable to charge the more rapidly polymerizing monomers incrementally during the polymerization so as to keep its effective concentration constant; for instance, the effective concentration of vinyl chloride or other monomers which are volatile at the polymerization temperature may be kept constant by an isobaric feed procedure wherein the vapor of the volatile monomer is charged continuously at a constant pressure, so that the vapor flows into the reactor as demanded by the ongoing polymerization.

With the foregoing general discussion in mind, there are given herewith detailed examples of the practice of this invention. All parts and percentages are by weight, unless otherwise indicated.

EXAMPLE I

| COPOLYMERS WITHOUT A THIRD MONOMER | |
|---|---|
| Water (deionized) | 200 grams |
| Vinyl chloride | 100 grams |
| Lauroyl peroxide | 1.5 grams |
| Methyl cellulose (100 centipoise) | 2.0 grams |
| Ethylenically unsaturated sulfonic compound (Identity per Table III) | Per Table III |
| Higher alkyl group containing compound (Identity per Table III) | Per Table III |

A series of runs was made in accordance with the above schedule, using different sulfonic acid amino compounds in the several runs as tabulated in Table III. In each case the sulfonic compound and amino compound, of the types and amounts selected for the run, were charged together with the water and methyl cellulose, into a polymerization bottle. The water was slightly acidified with acetic acid, and the contents swirled. Reaction was substantially instantaneous, and the amino salt of the sulfonic compound separated out as oily globules. A slight excess of vinyl chloride above the recipe amount was then charged and allowed to evaporate down to the recipe amount (as determined by tare and reweighing) thereby purging the free space in the bottle. The bottle was then sealed with a crown cap having a nitrile rubber seal and a perforation for the hypodermic injection of reactants. The lauroyl peroxide was then injected, and the bottle placed on a polymerizer wheel which dipped and revolved the bottle in a water bath at 50°C. for 18 hours. At the end of this time, the unreacted monomers were vented, the bottle was opened, and the granular polymer recovered by filtration and washed on the filter with deionized water. The polymer was then dried on a tray in an oven at 120°C. for 24 hours.

Each resin was dissolved to form a 10% solution in cyclohexanone and cast as a film on a glass plate, using a ten mil applicator bar. The film was dried on the plate in an oven at 130°C. for 15 minutes and then stripped off. The film was then examined for cationic dye acceptance by boiling the same for 15 minutes in a dye bath of the composition:

| | |
|---|---|
| Water (buffered to pH 4.0 with sodium acetate) | 1000 ml. |
| Cationic dye ("Sevron Red GL", a product of E. I. duPont de Nemours & Co.) | 0.1 gram |

Excellent dye tones were obtained in each case.

Set forth herewith are types and amounts of sulfonic compounds and of higher alkyl containing amino compounds used in the several runs.

TABLE III

| Ethylenically Unsaturated Sulfonic Compound Type | Grams Used | Higher Alkyl Group Amino Compound Type | Grams Used | Run No. |
|---|---|---|---|---|
| Sodium styrene sulfonate | 2.0 | N-coco beta amino propionic acid | 2.0 | 1 |
| Sodium methallyl sulfonate | 2.0 | Octyl decyl amine | 2.2 | 2 |
| Sodium vinyl sulfonate | 2.0 | Same | 2.2 | 3 |
| Sulfoethyl methacrylate | 2.0 | Same | 2.2 | 4 |
| 2-Acrylamido-2-methyl-propane sulfonic acid | 2.0 | Same | 2.2 | 5 |

EXAMPLE II

TERPOLYMERS WITH ACRYLONITRILE VARYING SULFONATE-AMINE LEVELS

| | |
|---|---|
| Water (deionized) | 200 grams |
| Vinyl chloride | 30 grams |
| Acrylonitrile | 70 grams |
| Sodium styrene sulfonate | 0–5 grams (per Table IV) |
| N-coco beta amino butyric acid | 0–5 grams (per Table IV) |
| Methyl cellulose (100 centipoise) | 2.0 grams |
| Azoisobutyronitrile | 1.5 grams |

A series of polymerization runs was carried out in accordance with the above schedule, varying the sodium styrene sulfonate and N-coco beta amino butyric acid from run to run as set forth hereinafter in Table IV. In each case the polymerization process and film dyeing procedure of Example I was followed, except that the polymerization was carried out at 60°C. instead of 50°C. The dye acceptance of the films was noted subjectively on a scale of 0–10, "0" indicating no dye take-up and "10" indicating that the film was dyed a very deep shade. Following are particulars of the several runs.

TABLE IV

| | Run No. 1 | 2 | 3 | 4 | 5 | 6 |
|---|---|---|---|---|---|---|
| Sodium Styrene Sulfonate Used (grams) | 0.0 | 2.0 | 0.0 | 0.1 | 2.0 | 5.0 |
| N-coco-beta amino butyric acid used (grams) | 0.0 | 0.0 | 2.0 | 0.1 | 2.0 | 5.0 |
| Dye Rating | 0.0 | 2 | 0 | 2 | 7 | 10 |

It will be seen that the sodium styrene sulfonate alone in substantial proportions (Run 2) gave only a moderate improvement in dye take-up, but when even very small proportions of both the styrene sulfonate and N-coco beta amino butyric acid were used, an equal degree of dye take-up was achieved (Run 4). When more substantial proportions of both these two components were used, a very marked improvement is achieved (Runs 5 and 6).

EXAMPLE III

MISCELLANEOUS MONOMERS

| | |
|---|---|
| Water (deionized) | 200 grams |
| Monomeric Composition (Per Table V) | 100 grams |
| Methyl cellulose (100 centipoise) | 2.0 grams |
| Lauroyl peroxide | 1.5 grams |
| Octyl decyl amine | 0 or 2.0 grams (per Table V) |
| 2-Acrylamido-2-methyl propane sulfonic acid ("AMPS" in Table V) | 0 or 2.0 grams (per Table V) |

A series of polymerization runs was carried out using various monomer compositions as set forth hereinafter in Table V, some containing the amine sulfonate salt, and some not. The procedure of Example I was followed, except of course that the formation of the amine sulfonate salt was omitted when its precursors (octyl decyl amine and 2-acryl amido-2-methyl propane sulfonic acid in Table V) were omitted. Following are particulars of the several runs.

TABLE V

| Monomer | Grams Used in Run No. | | | | | | | |
|---|---|---|---|---|---|---|---|---|
| | 1 | 2 | 3 | 4 | 5 | 6 | 7 | 8 |
| Vinyl chloride | 100 | 96 | 81 | 85 | 0 | 0 | 0 | 0 |
| Vinyl acetate | 0 | 0 | 15 | 15 | 0 | 0 | 0 | 0 |
| Styrene | 0 | 0 | 0 | 0 | 100 | 96 | 0 | 0 |
| Methyl methacrylate | 0 | 0 | 0 | 0 | 0 | 0 | 100 | 96 |
| "AMPS" | 0 | 2 | 2 | 0 | 0 | 2 | 0 | 2 |
| Octyl Decyl Amine | 0 | 2 | 2 | 0 | 0 | 2 | 0 | 2 |
| Dye Rating | 0 | 6 | 7 | 1 | 0 | 6 | 0 | 8 |

It will be seen that a variety of monomers other than vinyl chloride (vinyl acetate, styrene, methyl methacrylate, Runs 3, 6 and 8) may be used in this invention with good results. Also it will be seen that good dyeability was obtained with the use of the amine sulfonic salt (Runs 2, 3, 6 and 8) contrasted with poor results in the absence thereof (Runs 1, 4, 5 and 7).

EXAMPLE IV

| | |
|---|---|
| Vinyl chloride | 40 grams |
| Acrylonitrile | 60 grams |
| Vinyl Sulfonic Acid | 2.0 grams |
| Dimethyl Hexadecyl Amine | 2.0 grams |
| Butyl Mercaptan | 0.1 grams |
| Azoisobutyronitrile | 1.0 grams |
| Partially hydrolyzed polyvinyl | 0.2 grams |

```
alcohol
Water                              200.0 grams
Temperature— 65° C.
```

The vinyl sulfonic acid was added to the acrylonitrile, in which it did not dissolve. Five parts of water and all of the amine were then added and agitated. With mild heating the amine salt formed and dissolved uniformly in the acrylonitrile.

The water, polyvinyl alcohol, azoisobutyronitrile, mercaptan, vinyl chloride and 20 grams of the acrylonitrile-amine salt solution were added to a 2 liter agitated glass autoclave equipped with a heating and cooling jacket.

Polymerization was initiated and maintained at 65° C. The remaining acrylonitrile-amine salt mixture was pumped into the reactor so as to maintain a constant pressure or isobaric polymerization until it was completely used. The polymer was cooled, vented and isolated in the usual way. The polymer was dissolved in 10% dimethyl sulfoxide and spun into fiber. Dyeability was excellent.

From the foregoing general description and detailed specific examples it will be evident that this invention makes possible the production, in the highly economical aqueous polymerization systems, of excellent dye-receptive resins from a wide variety of monomeric materials. The key ingredient involved, the amine salt of the unsaturated sulfonic acid group containing compound is used in minor proportions and is inexpensively and reliably procurable.

I claim:

1. Process of Copolymerizing
    in an aqueous suspension system in which the monomers are suspended as globules in an aqueous medium
        in the presence of a free-radical initiator which is soluble in the mixture (I) specified hereinbelow
        said aqueous medium containing a colloidal-type suspending agent

| | | Parts by Weight |
|---|---|---|
| (I) | A mixture of 90–10 parts of acrylonitrile with 10–90 parts of vinyl chloride | 100 |
| with | | |
| (II) | an amine sulfonate salt monomer which is a salt of | 0.1 – 10.0 |

II-a. an anionic moiety which is 2-acrylamido-2-methyl-propane sulfonic acid with II-b. a cationic moiety which is a higher-alkyl-group-containing primary, secondary or tertiary amino compound, wherein the alkyl group or groups contain a total of 12–30 carbon atoms whereby to produce a cationic-dye-receptive polymeric product.

2. Process according to claim 1 wherein the cationic moiety (II–b) is selected from the group consisting of:
   N-coco beta-amino propionic acid
   octyl decyl amine
   lauryl amine
   octadecyl amine
   hexadecyl amine
   di-2-ethylhexyl amine
   di-cyclohexyl amine
   n-lauryl-myristyl beta-amino propionic acid
   dimethyl lauryl amine
   dimethyl tetradecyl amine
   dimethyl hexadecyl amine
   dimethyl octadecyl amine
   dimethyl behenyl amine
   triamyl amine
   dilauryl amine
   behenyl amine.

3. Process according to claim 2 wherein the cationic moiety (II–b) is a primary amine.

4. Process according to claim 2 wherein the cationic moiety (II–b) is a secondary amine.

5. Process according to claim 2 wherein the cationic moiety (II–b) is a tertiary amine.

6. Process according to claim 2 wherein the cationic moiety II–b) is N-coco beta-amino propionic acid.

* * * * *

UNITED STATES PATENT OFFICE
CERTIFICATE OF CORRECTION

Patent No. 3,923,755   Dated December 2, 1975

Inventor(s) Robert Albert Piloni

It is certified that error appears in the above-identified patent and that said Letters Patent are hereby corrected as shown below:

Column 2, line 9, (II-9) should be -- (II-a) --

Column 3, line 40, (II-9) should be -- (II-a) --

Column 8, line 43, II-b) should be -- (II-b) -- parentheses is missing.

Signed and Sealed this thirtieth Day of March 1976

[SEAL]

Attest:

RUTH C. MASON
*Attesting Officer*

C. MARSHALL DANN
*Commissioner of Patents and Trademarks*